United States Patent
Yanai

(10) Patent No.: US 9,832,349 B2
(45) Date of Patent: Nov. 28, 2017

(54) IMAGE PROCESSING APPARATUS AND IMAGE PROCESSING METHOD

(71) Applicant: CANON KABUSHIKI KAISHA, Tokyo (JP)

(72) Inventor: Tomokazu Yanai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/195,147

(22) Filed: Jun. 28, 2016

(65) Prior Publication Data
US 2017/0006186 A1 Jan. 5, 2017

(30) Foreign Application Priority Data
Jul. 2, 2015 (JP) .................. 2015-133918

(51) Int. Cl.
*G06F 15/00* (2006.01)
*H04N 1/54* (2006.01)

(52) U.S. Cl.
CPC ..................... *H04N 1/54* (2013.01)

(58) Field of Classification Search
None
See application file for complete search history.

(56) References Cited

U.S. PATENT DOCUMENTS

| 6,898,312 B2* | 5/2005 | Schroder | H04N 1/628 345/593 |
| 2011/0043838 A1* | 2/2011 | Yamada | B41J 2/2132 358/1.9 |
| 2011/0279836 A1* | 11/2011 | Nishikawa | H04N 1/6022 358/1.9 |
| 2012/0194595 A1* | 8/2012 | Kawafuji | G06K 15/1869 347/15 |
| 2015/0210072 A1* | 7/2015 | Sumiyoshi | B41J 2/0458 347/10 |
| 2016/0048747 A1* | 2/2016 | Awamura | G06K 15/1878 358/1.9 |
| 2016/0121620 A1 | 5/2016 | Yanai | |

FOREIGN PATENT DOCUMENTS

JP 2008-213271 A 9/2008
JP 2012-035603 A 2/2012

* cited by examiner

Primary Examiner — Helen Q Zong
(74) Attorney, Agent, or Firm — Carter, DeLuca, Farrell & Schmidt, LLP

(57) ABSTRACT

The invention causes a gloss observed in a reproduction to approach a gloss of a target even if a range in which it is possible to change the gloss in the reproduction is small. An input unit inputs color and gloss data including at least a color signal and a gloss signal of the target to reproduce. A mapping unit maps the color and gloss data into a gloss representable range based on information indicating a gloss representable range of the gloss representation device. A signal generation unit generates, based on the color and gloss data after the mapping, an output signal outputted to the gloss representation device. The mapping unit performs a mapping that saves information indicating a local gloss difference in accordance with a spatial distribution of the gloss signal as the mapping of the gloss signal.

15 Claims, 13 Drawing Sheets

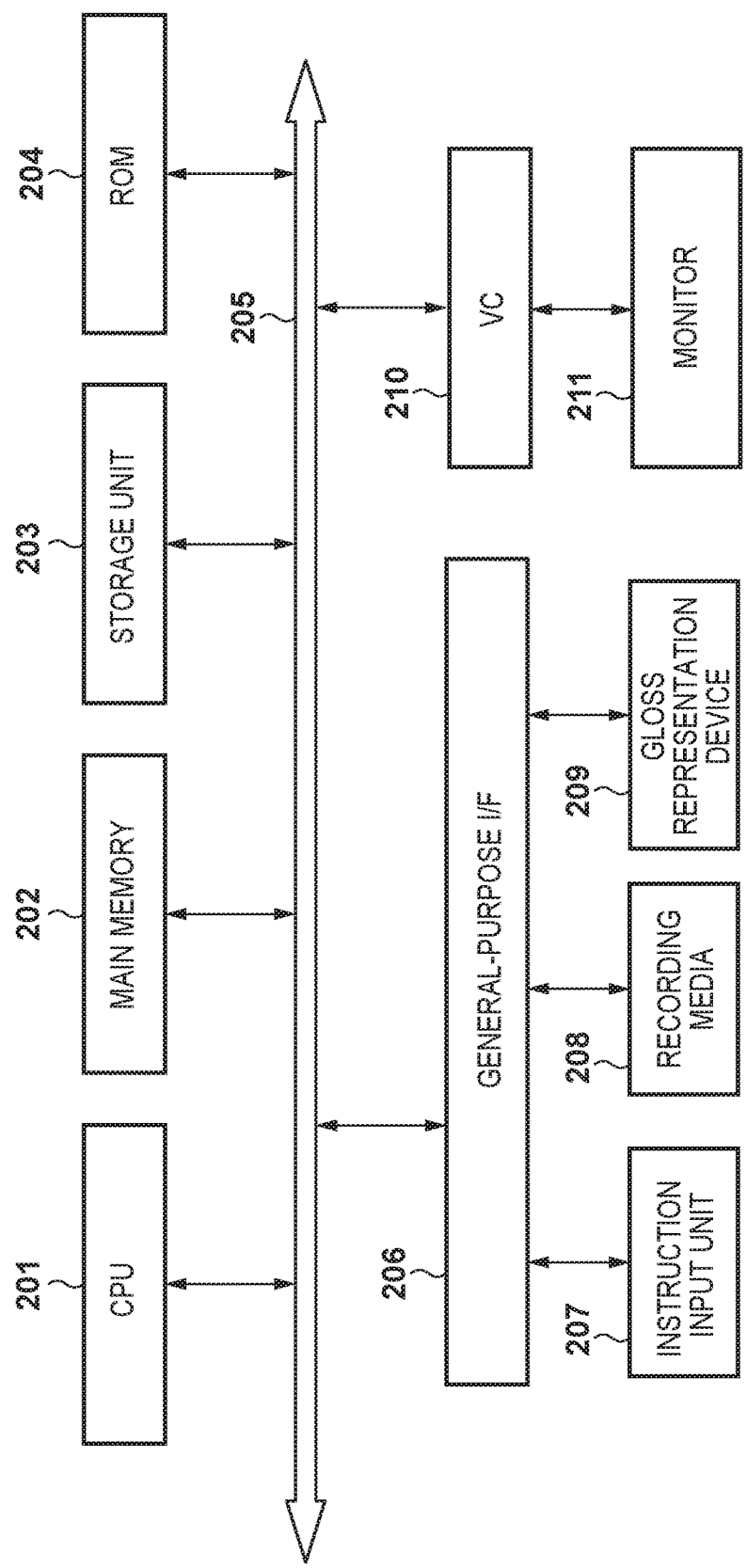

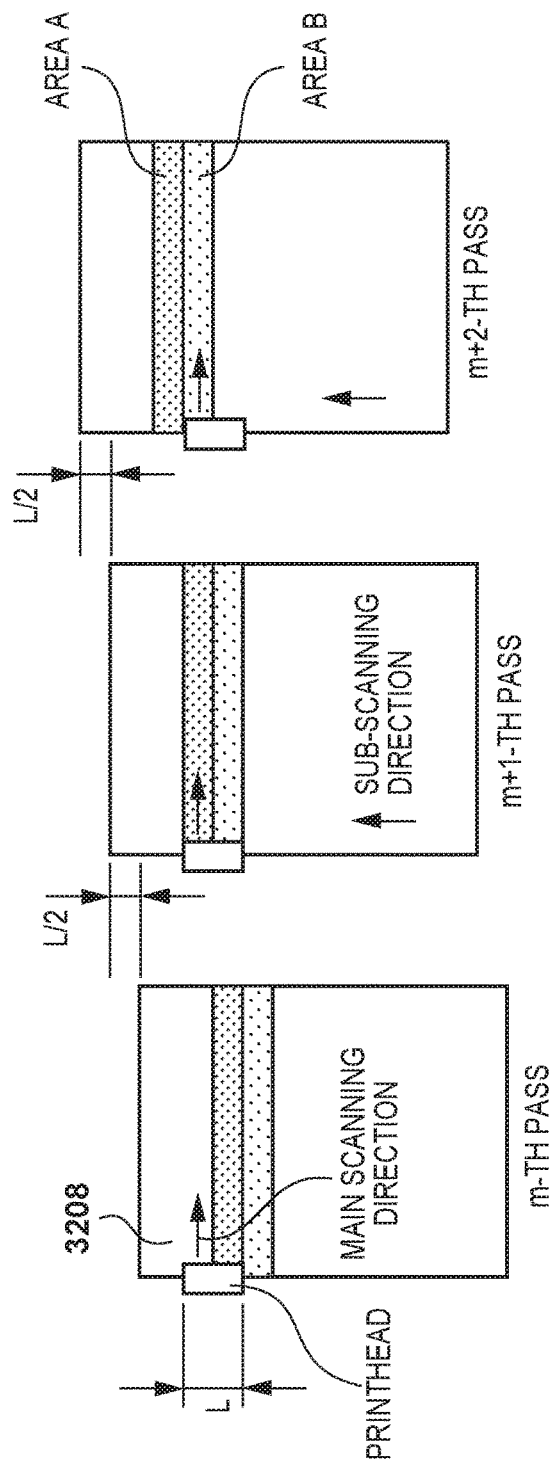

F I G. 10

| C | M | Y | K | A | B | P | L | a | b | g | s |
|---|---|---|---|---|---|---|---|---|---|---|---|
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |
| xx | xx | xx | xx | xx | xx | xx | xx | xx | xx | xx | xx |

FIG. 11A FIG. 11B FIG. 11C FIG. 11D FIG. 11E FIG. 11F FIG. 11G

IMAGE PROCESSING APPARATUS AND IMAGE PROCESSING METHOD

BACKGROUND OF THE INVENTION

Field of the Invention

The present invention relates to image processing for performing gloss representation processing.

Description of the Related Art

In recent years, for printing using a plate as typified by offset printing and the like, a tendency towards quality increases and individualization has been progressing further in the field of printing of paper containers and the like which are used for a packaging of posters, pamphlets, cosmetics, and the like. A technique which controls a local change in a gloss is used for a method of representing increases in quality and individualization. For example, a method which emphasizes a presence of an object using varnish ink to enhance a gloss of an object area desired to be emphasized more than a periphery is used.

Meanwhile, a method has been proposed to change/control a gloss by using a gloss adjustment material or a design of a print process even in a representation of a digital printer that does not use a plate, as typified by a pigment inkjet printer. For example, a method of controlling which causes a gloss to approach uniformity by controlling a number of record scannings in order to reduce a gloss difference in accordance with a color material has been proposed (Japanese Patent Laid-Open No. 2012-035603, hereinafter patent document 1). Also, a method which controls a gloss and by controlling an area in which a gloss adjustment material coats a surface of a print material has been proposed (Japanese Patent Laid-Open No. 2008-213271, hereinafter patent document 2).

For pigment inkjet printers and the like, restrictions of recording media and printing material are heavy, and the range in which gloss can be changed is small. For this reason, in a case of reproducing, by a pigment inkjet printer, a object that is a target (hereinafter referred to as a target object) to be represented by including a gloss, the effect of the gloss which is seen or observed in the reproduction, is limited even if the methods disclosed in patent documents 1 and 2 are used. In other words, there is a case in which an expected gloss representation cannot be achieved and the range in which gloss can be changed is small.

SUMMARY OF THE INVENTION

The present invention provides a technique causing a gloss observed in a reproduction to approach a gloss of a target even if a range in which it is possible to change the gloss in the reproduction is small.

According to an aspect of the invention, there is provided an image processing apparatus that performs gloss representation processing for representing a gloss of a target, the apparatus comprising: an input unit configured to input image data including at least one of a color signal and a gloss signal that expresses a target that is reproduced; a mapping unit configured to map, based on information indicating a gloss representable range of a gloss representation device, the image data to the gloss representable range; and a generation unit configured to generate, based on image data after the mapping, an output signal outputted to the gloss representation device, wherein the mapping unit performs a mapping that saves information indicating a local gloss difference in accordance with a spatial distribution of the image data as the mapping of the image data.

By virtue of the present invention it is possible to cause a gloss observed in a reproduction to approach a gloss of a target even if a range in which it is possible to change the gloss in the reproduction is small.

Further features of the present invention will become apparent from the following description of exemplary embodiments (with reference to the attached drawings).

BRIEF DESCRIPTION OF THE DRAWINGS

FIG. 5 is a block diagram illustrating an example configuration of an information processing apparatus that executes image processing of an embodiment.

FIG. 7 is a view for describing multi-pass recording.

FIG. 10 is a view illustrating an example of a device property table of the gloss representation device.

FIGS. 11A-11G are views illustrating examples of pass masks.

DESCRIPTION OF THE EMBODIMENTS

An image processing apparatus and an image processing method of exemplary embodiments of the present invention will be described hereinafter in detail, with reference to the drawings. Note that these embodiments do not limit the present invention according to the scope of the claims, and not all of the combinations of configurations described in the embodiments are necessarily required with respect to the means to solve the problems according to the present invention.

[Gloss Representation]

Firstly, a gloss representation will be described. Hereinafter, a target object to be represented by including a gloss will be referred to as a "target", and what is acquired by a device that reproduces a target will be referred to as a "reproduction". Also, an advantageous gloss representation is defined to be a gloss representation for which an impression of a gloss difference appears the same, though details will be described later.

For a gloss signal which is a numeric value representation of a gloss, a value of an "image vividness" and a value of a "specular gloss" measured in accordance with a known method, for example, are typically used.

"specular gloss" expresses a property related to a brightness of a specular reflected light, and "image vividness" expresses a property related to a vividness of an illuminated image that is captured on a sample. Hereinafter, a property related to this vividness of the illuminated image will be referred to as a "gloss clarity". When the gloss clarity is high it means that the image vividness is high.

The "gloss clarity" is not necessarily limited to a value measured under a standard condition, and may be a value measured under other conditions or may be a function. For example, in a vicinity of a specular reflection direction, an angle φ may be formed between a direction at which a reflected light amount is half the specular reflected light and the specular reflection direction is measured, and an inverse function of that angle may be used. In other words, the gloss clarity may be computed from a sharpness of the specular reflected light.

Figure 1:
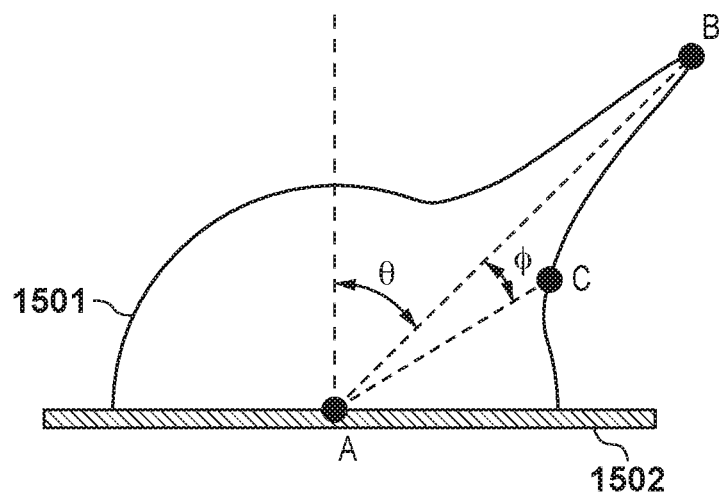
FIG. 1 is a view illustrating a typical variable reflection property.

FIG. 1 is a view illustrating a typical variable reflection property. In FIG. 1, a curved line 1501 illustrates a reflected light amount from a point A of a sample 1502. A direction of an angle θ in which the reflected light amount is large is a specular reflection direction with respect to illumination, and the length of a line segment AB indicates a reflected light amount in the specular reflection direction. The point C is a point at which the length of a line segment AC is half the length of the line segment AB, and an angle formed between the line segment AB and the line segment AC is the angle φ. For a sample with a high gloss clarity, a light diffusion in a vicinity of the specular reflection direction is small, and the angle φ indicates a small value. Conversely, the angle φ of a sample whose gloss clarity is low indicates a large value.

The "specular gloss" is not necessarily limited to a value measured under a standard condition, and may be a value measured under other conditions, and may be a function. For example, an opening angle of light reception of a reflected light amount strength (corresponds to the length of the line segment AB in FIG. 1) in the specular reflection direction may be made to be a value other than of a standard condition. Also, a measured illumination direction may be 30 degrees, and an opening angle of light reception and an illumination also are not limited to a standard condition.

A signal corresponding to a specular gloss may be a signal including color information and not only brightness information. It is possible to measure a reflected light amount in a specular reflection direction for each wavelength, for example, as a signal including color information, and to use a CIELAB value. In such a case, a transformation of a signal corresponding to a specular gloss in a gloss mapping is a transformation in a three dimensional color space. For a transformation method, it is possible to use a publicly known color mapping method similarly to a transformation of a color signal.

In any case, if a reproduction is formed so as to make a value of a "specular gloss" and a value of a "gloss clarity (image vividness)" match (hereinafter referred to simply as "gloss matching") those of a target, it is possible to make the appearance of the gloss match approximately. However, in a digital printer as typified by a pigment inkjet printer, the range in which the value of the "specular gloss" and the value of the "gloss clarity (image vividness)" can change (hereinafter referred to simply as "the changeable range") is small because restrictions on recording media and printing material are heavy. If the changeable range is small, it is difficult to achieve gloss matching.

Hereinafter, description is given of image processing for performing advantageous gloss representation in which the gloss difference impression appears the same even if gloss matching is not achieved in a case where a device having a small changeable range is used. Additionally, description is given of image processing for performing an advantageous gloss representation for which an impression of a gloss difference appears the same even if the value of the "specular gloss" and/or the value of the "gloss clarity" is suppressed to within the changeable range.

Above, gloss clarity was defined to be a value of the "image vividness", but a value of a known "reflection haze" may be used for a representation of a gloss clarity.

Also, in the embodiment, in addition to gloss, a conventional color signal may be handled. For a color signal which is a numeric value representation of a color, it is possible to use a CIELAB value, for example. A CIELAB value mainly expresses properties related to a chromaticity and a brightness of a diffuse reflected light. When directions other than the specular reflection direction and directions in the vicinity of the specular reflection direction are assumed to be diffuse reflection directions, a diffuse reflected light corresponds to a light reflected in a direction of diffuse reflection. If a reproduction is formed so that a CIELAB value matches that of the target, it is possible to cause the appearance of the diffuse reflection direction to approximately match the target. Note that a technique of color mapping for performing an advantageous color representation such that an impression of color difference appears the same is publicly known, and so a description of a technique of color mapping is omitted.

First Embodiment

[Gloss Representation Processing]

Figure 2:
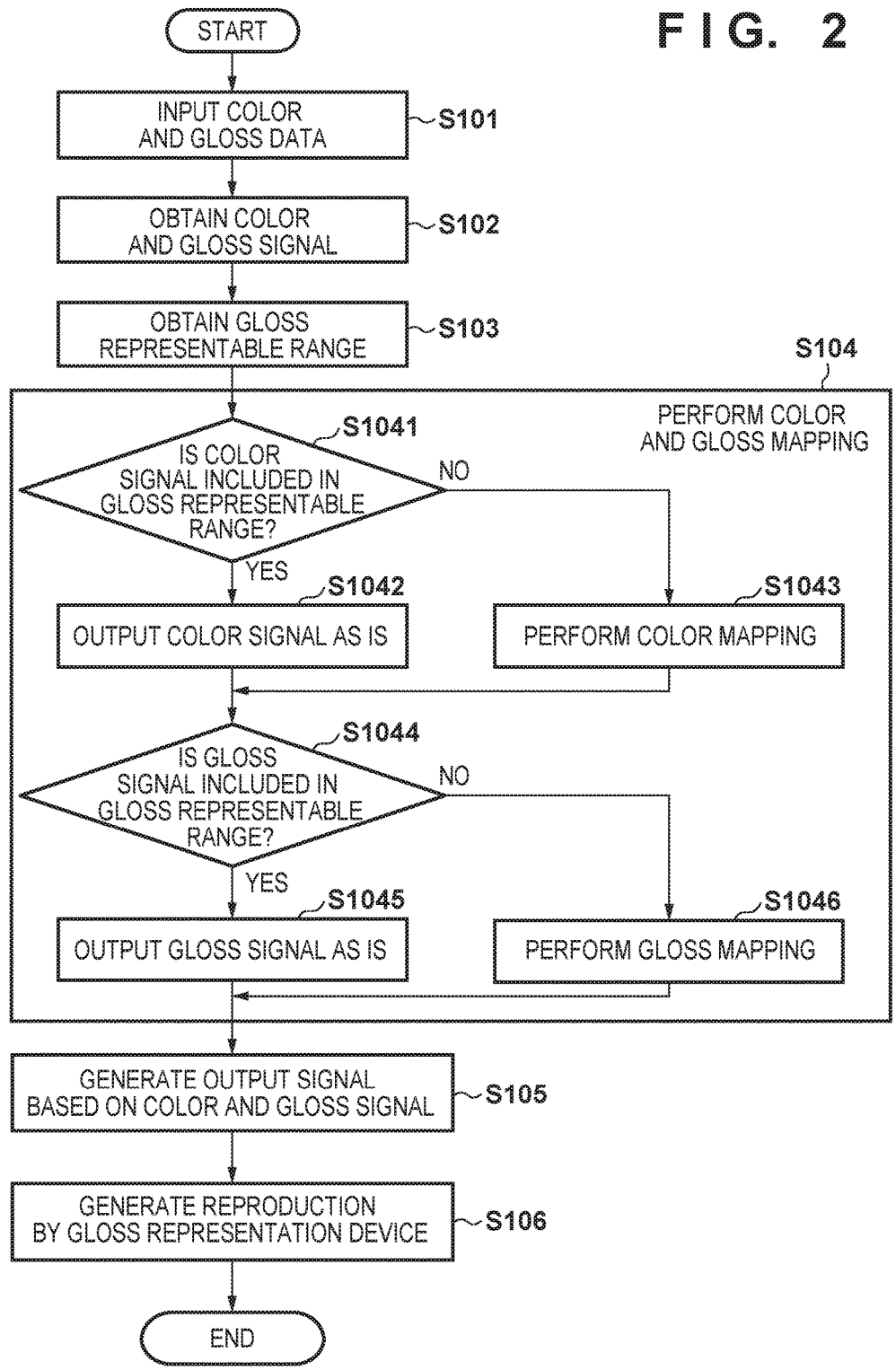
FIG. 2 is a flowchart illustrating an example of gloss representation processing.

An example of gloss representation processing is illustrated by the flowchart of FIG. 2. Firstly, color data and gloss data of the target is input (step S101). The color data and the gloss data are image data indicating the color and the gloss of the target, and hereinafter the color data and the gloss data will be referred to collectively as "color and gloss data". If the color or the gloss of the target differs depending on the area or the pixel, the color and gloss data is input for each area or pixel. Also, an sRGB signal or a CIELAB signal is input as color data, and a gloss signal which is a specular gloss value or a gloss clarity value is input as gloss data.

Regarding the form of the color and gloss data, an image data format in which, as a gloss signal, a value of a specular gloss and a value of a gloss clarity are recorded in a channel other than a channel of an RGB value or a Lab value, for example, is envisioned, and hereinafter description is given with premised upon color and gloss data of such a form. Of course, gloss data may be prepared as other data that is associated with RGB image data or Lab image data, and these may be input collectively or sequentially.

Next, the color signal and the gloss signal (hereinafter referred to as the color and gloss signal) are acquired from the inputted the color and gloss data (step S102), and information indicating a gloss representable range of the gloss representation device is acquired (step S103). The gloss representable range of the gloss representation device is stored in advance in a storage device as information (hereinafter referred to as representation range information) that indicates a combination of values of a gloss clarity, a specular gloss, and a CIELAB value reproducible on the device.

Next, based on the gloss representable range that the representation range information indicates, the color and gloss signal is transformed into a color and gloss signal corresponding to a gloss and a color representable in the gloss representation device (step S104). The transformation in this step is a "color and gloss mapping", and the details of the color and gloss mapping will be described later.

Next, based on the color and gloss signal after the color and gloss mapping, an output signal outputted to the gloss representation device is generated (step S105). The gloss representation device is an image recording device such as a printer, for example, and an output signal is a signal related to the amount of printing material that the image recording device has, for example, and will be described later in detail.

Next, a reproduction is generated by the gloss representation device based on the output signal (step S106). Note that data configured in the output signal in relation to "color and gloss data" configured in the color and gloss signal is referred to as "control data". In other words, step S104 is a step in which the inputted color and gloss data is transformed into color and gloss data corresponding to the gloss that a gloss representation device can represent. Also, step S105 is a step in which the color and gloss data acquired in step S104 is transformed into control data of the gloss representation device.

Note that the foregoing procedure is only one example, and the representation range information may be acquired before input of the color and gloss data, for example.

Color and Gloss Mapping

In the color and gloss mapping (step S104), first, it is determined whether or not the color signal acquired in step S102 is included in the gloss representable range, that is, whether or not it is a color signal that can be represented by the gloss representation device (step S1041). In other words, if the CIELAB value in the color signal is included in the gloss representable range, it is determined to be a color signal that can be represented by the gloss representation device, and the color signal is outputted as is as the color signal after mapping (step S1042).

Meanwhile, if it is determined to be a color signal for which representation by the gloss representation device is impossible, based on the gloss representable range that the representation range information indicates, the color signal is transformed into a color signal corresponding to a color that can be represented in the gloss representation device (step S1043). The transformation in this step is a "color mapping".

The color mapping may be performed by a publicly known method. For example, the color signal is transformed into a color signal corresponding to a color that can be represented by the gloss representation device for which a color difference ΔE is a minimum maintaining a hue angle. It is possible to use an ab hue angle value and a CIEDE2000 value for the hue angle and the color difference ΔE respectively.

Next, it is determined whether or not the gloss signal acquired in step S102 is included in the gloss representable range (step S1044). That is, it is determined to be a gloss signal that can be represented by the gloss representation device if either the value of the specular gloss or the value of the gloss clarity in the gloss signal, or a combination of the value of the specular gloss and the value of the gloss clarity, is included in the gloss representable range. In such a case, the gloss signal is outputted as the gloss signal after mapping as is (step S1045).

Meanwhile, if it is determined to be a gloss signal for which representation by the gloss representation device is impossible, based on the gloss representable range that the representation range information indicates, the gloss signal is transformed into a gloss signal corresponding to a gloss that can be represented in the gloss representation device (step S1046). The transformation in this step is a "gloss mapping".

The gloss mapping is a processing step that, in a case where a gloss signal outside of the gloss representable range of the gloss representation device is input, adjusts the range of the gloss signal to keep it within the gloss representable range of the gloss representation device. Furthermore, for the gloss mapping, processing is performed that maintains an advantageous gloss that provides an impression that the inputted gloss signal is represented as is even though a range adjustment is performed.

Gloss Mapping

Figure 3:
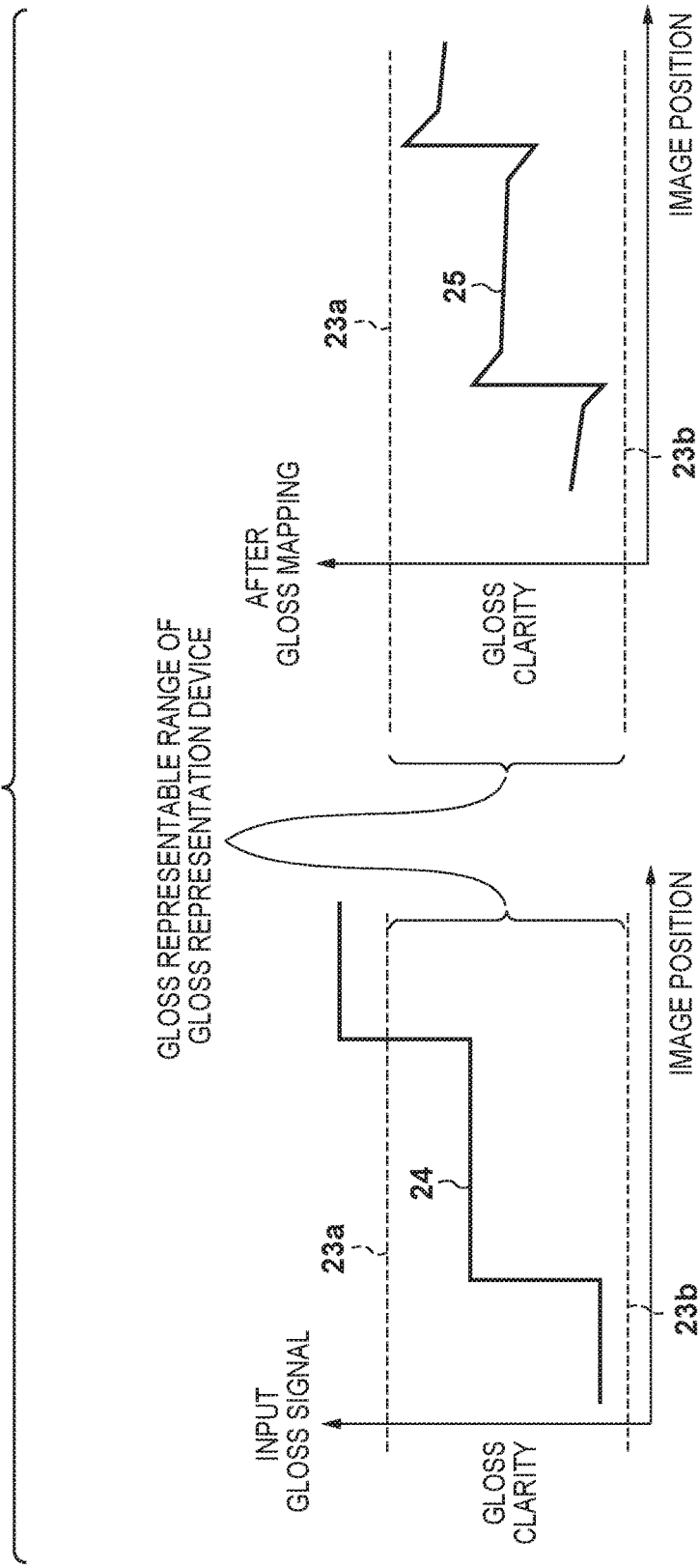
FIG. 3 is a view for describing a gloss mapping.

By FIG. 3, a gloss mapping is described. In FIG. 3, a gloss signal 24 illustrates an example of a gloss signal acquired in step S102, and a gloss signal 25 illustrates an example of a gloss signal after a gloss mapping. Also, in FIG. 3, the horizontal axis expresses a position on an image, and the vertical axis expresses a gloss clarity, and dashed lines 23a and 23b illustrate the representation range of the gloss clarity in the gloss representable range of the gloss representation device. That is, the range sandwiched between the dashed lines 23a and 23b is the gloss clarity that can be represented in the gloss representation device.

The gloss signal 24 changes in accordance with the image position, and has a value of a gloss clarity that exceeds a representation range of the gloss clarity. When the gloss signal 24 is inputted, the gloss signal 24 is mapped to the gloss signal 25 which has a gloss clarity value in the representation range for the gloss clarity. In other words, the value of the gloss signal as represented by the gloss clarity or the like is adjusted by the gloss mapping.

The inventor found that an advantageous gloss representation in which the impression of the gloss difference appears the same is possible if, even when the value of the gloss signal differs between the image prior to mapping, as represented by that for gloss clarity or the like, and the image after it, information indicating a local gloss difference between these (later explained information indicating a local contrast) is saved.

Figure 4A:
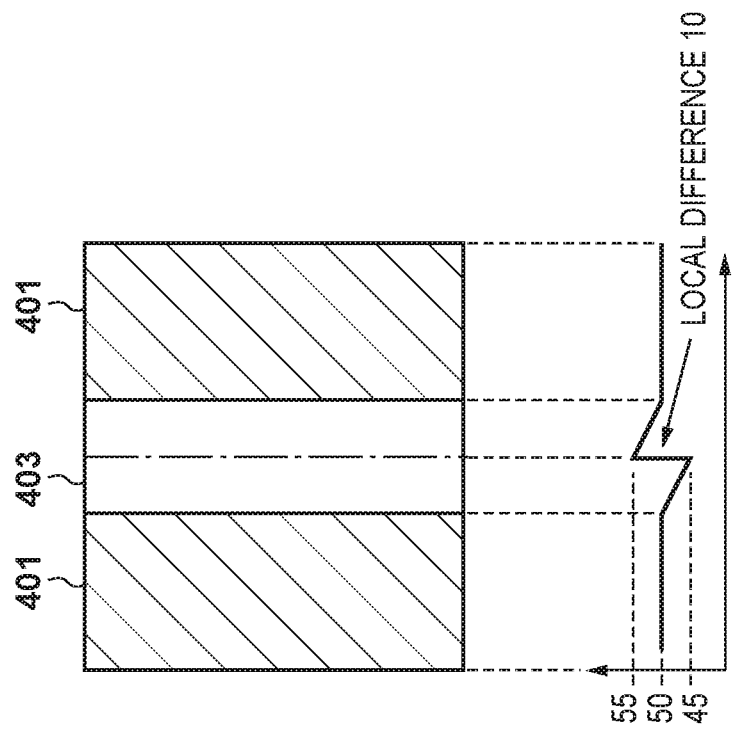
FIGS. 4A and 4B are views for describing an advantageous gloss representation.
Figure 4B:
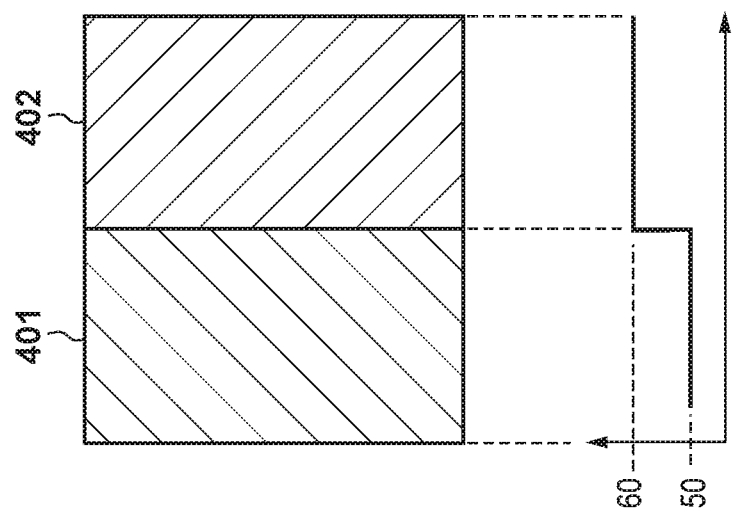

FIGS. 4A and 4B are views for describing an advantageous gloss representation. FIG. 4A illustrates a state in which patches 401 and 402 whose gloss clarities are different are arranged adjacently. In FIG. 4A, the patch 401 has 50 as a gloss clarity value, and the patch 402 has 60 as a gloss clarity value. Note that the gloss clarity is measured by a method for measuring an image vividness.

FIG. 4B illustrates a state in which patches 401 whose gloss clarities are the same are arranged with an area (hereinafter referred to as a local change area) 403 in which the gloss clarity changes locally is sandwiched between them. In FIG. 4B, the patches 401 on the left and the right have "50" as gloss clarity values, and after the gloss clarity value in the local change area 403 has the property that it decreases from "50" to "45", it suddenly increases to "55", and after that is decreases to "50", and the local difference in the gloss clarity in the area 403 is "10".

The samples illustrated in FIGS. 4A and 4B were presented separately to a plurality of subjects, who were allowed to observe the gloss differences in the left and the right patches in each sample. The inventor confirmed that the result of this was that the gloss difference between the left and the right patches in the sample of FIG. 4A, and the gloss difference of the left and the right patches in the sample of FIG. 4B appear the same. The inventor confirmed a similar phenomenon for specular gloss. Such a phenomenon is that the impression of the gloss difference appears the same.

Such a phenomenon indicates that the gloss difference can be represented by a local representation of a gloss difference (the local difference "10") without the need to represent an absolute gloss difference when representing a gloss difference (for example, gloss clarities "50" and "60"). In order to save this kind of local information, and keep the specular gloss and the gloss clarity (the image vividness) within the gloss representable range of a device whose changeable range is small, later described processing for realizing an advantageous gloss representation is performed in gloss mapping (step S206).

[Device Configuration]

A block diagram in FIG. 5 illustrates an example configuration of the information processing apparatus for executing the image processing of the embodiment. A microprocessor (CPU) 201 uses a main memory 202 such as a RAM as a work memory, executes a program stored in a storage unit 203 or a ROM 204 such as an HDD or an SSD, and controls the later described configuration through a system bus 205. Note, programs and various data are stored in the storage unit 203 or the ROM 204 for executing an advantageous gloss representation and for realizing the above described gloss representation processing (steps S101 through S106).

An instruction input unit 207 such as a keyboard or a mouse, recording media (a computer-readable storage medium) 208 such as a USB memory or a memory card, a gloss representation device 209, or the like, are connected to a general-purpose interface (I/F) 206 such as a USB. Also, a user interface (UI) and information indicating processing progress or processing results are displayed by the CPU 201 on a monitor 211 connected to a video card (VC) 210.

For example, the CPU 201 loads an application program (AP) stored in the ROM 204, the storage unit 203 or the recording media 208 to a predetermined area of the main memory 202 in accordance with a user instruction inputted through the instruction input unit 207. Then, the AP is executed and a UI is displayed on the monitor 211 in accordance with the AP.

Next, the CPU 201 loads various data stored in the storage unit 203 or the recording media 208 into a predetermined area of the main memory 202 in accordance with a user instruction. Then, predetermined calculation processing is performed on various data loaded to the main memory 202 in accordance with the AP. Then, the CPU 201 displays a calculation processing result on the monitor 211, stores it to the storage unit 203 or the recording media 208, or outputs it to the gloss representation device 209 in accordance with a user instruction. Also, the CPU 201 is capable of acquiring various information from the gloss representation device 209 through the general purpose I/F 206.

Note, the CPU 201 is also capable of performing transmission and reception of programs, data, and calculation processing results with a computing device or a server device on a wired or a wireless network through a network interface (not shown graphically) connected to the system bus 205. Also, the monitor 211 and the instruction input unit 207 may overlap in a touch panel, and in that case, the information processing apparatus is a computer device such as a tablet device or a smart phone.

[Configuration of Gloss Representation Device]

Figure 6:
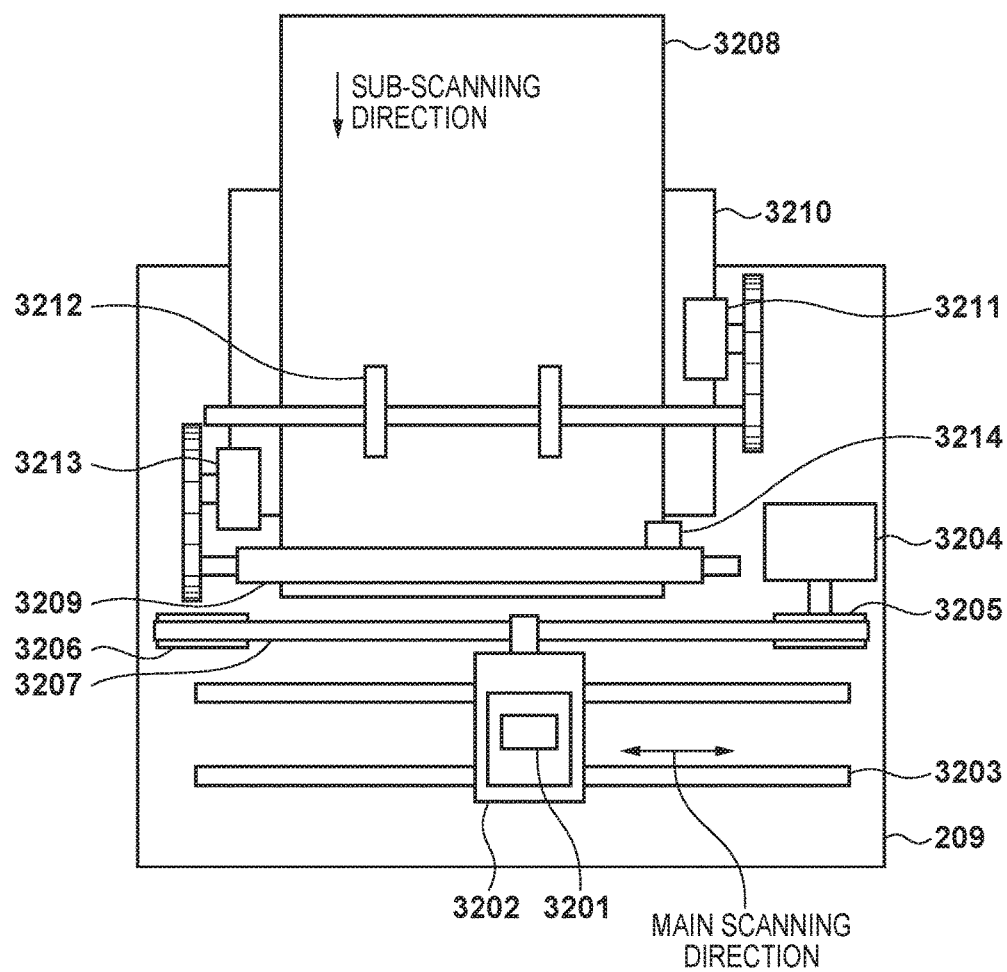
FIG. 6 is an outline view for describing an example configuration of a gloss representation device.

An example configuration of the gloss representation device 209 is described using an outline view of FIG. 6. Note, an example of an ink-jet type image forming apparatus as the gloss representation device 209 is illustrated in FIG. 6.

A head cartridge 3201, which is mounted to a carriage 3202 and exchangeable, has a printhead containing a plurality of record elements corresponding to a plurality of printing material discharge ports and an ink tank for supplying an ink to the printhead. Additionally, the head cartridge 3201 has a connector for transmitting/receiving a printhead signal such as a drive signal of each record element.

The carriage 3202 has a connector holder for transferring a signal to the head cartridge 3201 via a connector and is capable of a round trip movement along guide shaft 3203. In other words, the location and movement of the carriage 3202 is controlled by a driving mechanism configured by a motor pulley 3205 and a driven pulley 3206 whose driving source is a main-scanning motor 3204, and a timing belt 3207. The discharge port surface of the head cartridge 3201 is held so that it is projecting from the carriage 3202 downward and is parallel to a recording paper 3208. Movement along the guide shaft 3203 of the carriage 3202 is "main-scanning", and the movement direction is a "main scanning direction".

The recording paper 3208 is mounted on an auto sheet feeder (ASF) 3210. Upon the image formation, a pick-up roller 3212 is driven by a sheet supply motor 3211 via a gear, and a recording paper is separated one sheet at a time and fed from an ASF 3210. Then, the recording paper 3208 is conveyed to a recording start position facing the discharge port surface of the head cartridge 3201 on the carriage 3202 by a rotation of a conveyance roller 3209. The conveyance roller 3209 is driven by a line feed (LF) motor 3213 via a gear. A determination as to whether or not the recording paper 3208 is conveyed to the recording start position is performed by a passage detection of the recording paper 3208 using a sheet end sensor 3214.

After the recording paper 3208 is conveyed to the recording start position, the carriage 3202 moves along the guide shaft 3203 over the recording paper 3208 and an ink is discharged from each discharge port of the printhead in accordance with the drive signal upon the movement. When the moving carriage 3202 reaches one end of the guide shaft 3203, the recording paper 3208 is conveyed a predetermined distance in a direction orthogonal to the main-scanning direction by the conveyance roller 3209. This conveyance of the recording paper 3208 is a "paper feed" or "sub-scanning", and the conveyance direction is a "paper feed direction" or "sub-scanning direction".

When the paper feed of the recording paper 3208 is complete, the carriage 3202 moves along the guide shaft 3203 again, and an ink is discharged from each discharge port of the printhead in accordance with the drive signal. In this way, the main-scanning and the paper feed (sub-scanning) are repeated by the carriage 3202 and an image is formed on the recording paper 3208.

Multi-pass recording for forming an image scanning the same line of the recording paper 3208 a plurality of times by the printhead is described using FIG. 7. FIG. 7 illustrates a two-pass recording, and, for example, an image recording of a portion with a recording width L of the printhead is performed in main-scanning, and each time when the recording of a portion of one main-scan completes, the recording paper 3208 is conveyed a distance of L/2 in the sub-scanning direction. The recording of an area A shown in FIG. 7 is completed by the m-th main-scan and the m+1-th main-scan, and the recording of an area B is completed by the m+1-th main-scan and the m+2-th main-scan.

In a case where n-pass recording is performed, every time a recording of one main-scan completes, the recording paper 3208 is conveyed a distance L/n in the sub-scanning direction, and an image is formed by the printhead performing main-scans n times on the same line of the recording paper 3208. Note, the recording width L corresponds to the length in the sub-scanning direction of a discharge port row, and corresponds to the length in the sub-scanning direction of the area that the gloss representation device 209 can record in one main-scan.

Generally, the larger the number of recording passes becomes, the longer the time required for the image formation, but an influence of a variation of a discharge amount or discharge direction of each ink discharge port of the printhead is suppressed and density unevenness becomes difficult to notice. Also, the larger the number of recording passes becomes, the broader the gloss representable range can become. Furthermore, the ink amount recorded in one pass becomes smaller, and dots formed in one pass are more dispersed. By recording in a plurality of passes, granular dots overlap, and tiny unevennesses are formed on the surface of the recording paper 3208. As a result, scattering of surface-reflected light becomes larger, and a gloss with a small gloss clarity can be represented.

Conversely, when the number of recording passes is restricted and the image formation is performed with a small number of recording passes, the ink amount recorded in one pass becomes larger, as a result of the ink forming a layer and contributing to smoothing the surface of the recording paper 3208, scattering of surface-reflected light becomes less, and a gloss with large gloss clarity can be represented. However, the level of the formed unevenness on the surface depends on physical properties of the printing material, and it differs depending on the type of the printing material. Also, the amount of color material changes depending on the color to be reproduced. Therefore, a range of the gloss clarity that can be controlled differs depending on the color. In other words, the representation range of the gloss clarity changes depending on the color.

In a case where n-pass recording is performed in the multi-pass recording shown in FIG. 7, a recording width in one main-scan is L/n because the recording paper 3208 is conveyed a distance L/n in the sub-scanning direction every main-scan. On the other hand, in the present embodiment, as will be described later in detail, a reproduction is generated by a plurality of main-scans of the same unit recording area, with an area which the gloss representation device can record in one main-scan as a unit recording area.

Printhead

Figure 8B:
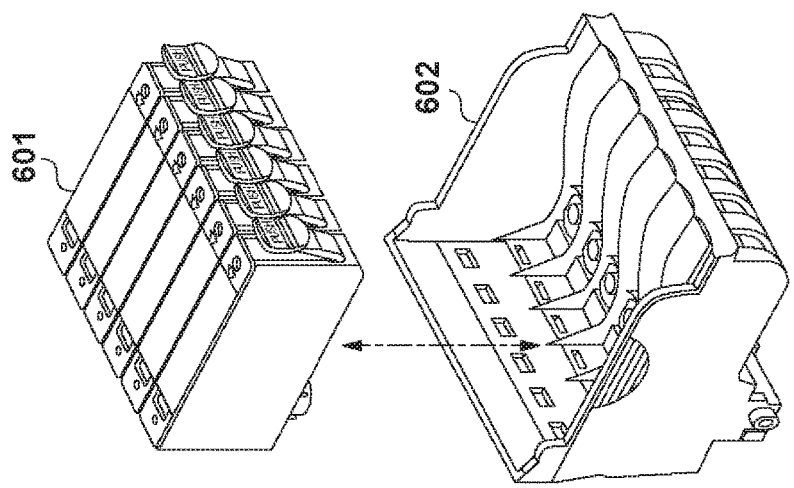
FIGS. 8A and 8B are views illustrating an example configuration of a head cartridge.
Figure 8A:
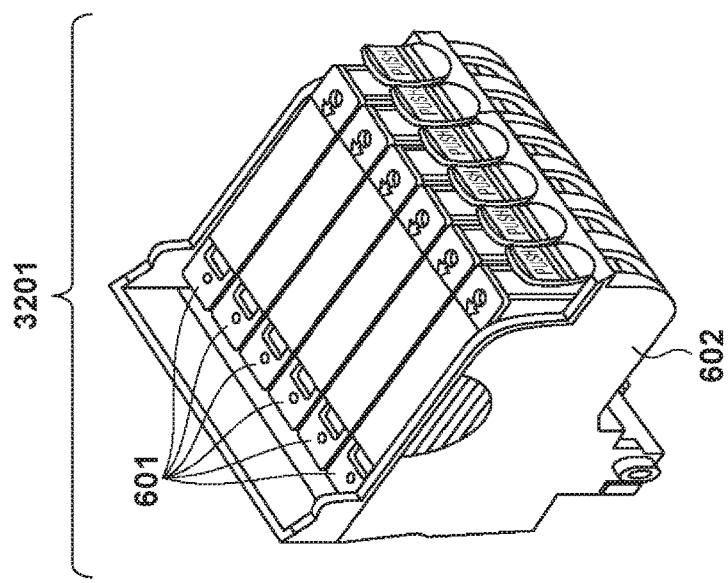

An example configuration of the head cartridge 3201 is illustrated in FIG. 8A. The head cartridge 3201 has ink tanks 601 for storing ink as a printing material and a printhead 602 for discharging the ink supplied from the ink tanks 601 in accordance with a discharge signal. For example, the head cartridge 3201 comprises respective ink tanks for yellow Y, magenta M, cyan C, black K, gloss adjustment material A and gloss adjustment material B independently. Each ink tank 601 is demountable in relation to the printhead 602, as shown in FIG. 8B.

It is advantageous that the gloss adjustment material A and the gloss adjustment material B be colorless and transparent materials with different refractive indexes. However, the gloss adjustment materials may be materials which are not completely transparent and are somewhat colored, and may be materials which are nearly colorless and transparent. The refractive index of the gloss adjustment material A is larger than the refractive index of the gloss adjustment material B.

A large degree of reflection and a gloss with a large specular gloss can be represented in an area where the gloss adjustment material A which has a large refractive index is recorded on the uppermost surface (outermost surface) of the recording surface. Conversely, a small degree of reflection and a gloss with a small specular gloss can be represented in an area where the gloss adjustment material B which has a small refractive index is recorded on the outermost surface. Also, if a usage ratio between the gloss adjustment materials A and B in an area is adjusted, a specular gloss that is intermediate to the cases where they are used alone can be represented.

However, there is a restriction on the total amount of the printing material that can be recorded. Also, because the amount of color material to be used changes depending on the reproduced color, the amount of the gloss adjustment material that can be used changes depending on the color. Therefore, the range of the specular gloss that can be controlled differs depending on the color. In other words, the representation range of the specular gloss changes depending on the color.

[Processing Configuration of Gloss Representation System]

Figure 9:
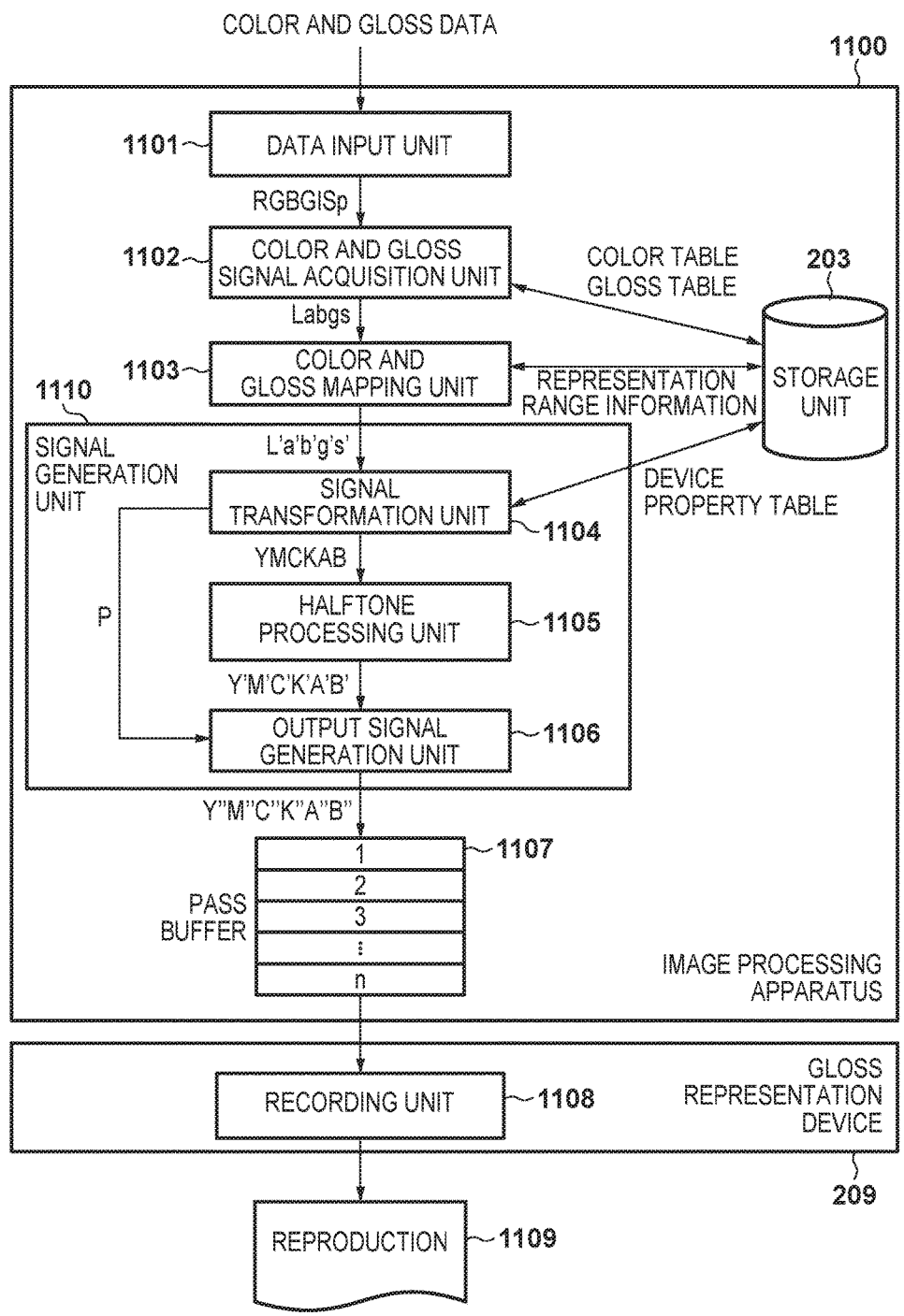
FIG. 9 is a block diagram for describing an example of a processing configuration in a gloss representation system.

An example of a processing configuration in a gloss representation system is described using a block diagram in FIG. 9. The processing configuration and the function illustrated in FIG. 9 are realized by operation of an image processing apparatus 1100 which is realized by execution of a program for the above-described image processing (steps S101 through S106) by the CPU 201, and of the gloss representation device 209 based on instructions of the CPU 201.

A data input unit 1101 inputs color and gloss data from the storage unit 203, the recording media 208 or a server device (not shown). The color and gloss data is configured from a color signal and a gloss signal, and each pixel of the color and gloss data has a gloss signal GlSp (2 components) in addition to a general color signal RGB (3 components). The gloss signal Gl is a component signal corresponding to a specular gloss and the gloss signal Sp is a component signal corresponding to the gloss clarity.

A color and gloss signal RGBGlSp configuring the color and gloss data is for example a digital signal with 40 bits in total where each component is 8 bits. Note, the format of the color and gloss data is not limited to the above and for example a configuration may be taken such that two types of data—image data configured by a color signal RGB, and gloss data configured by a gloss signal GlSp—are inputted. Also, a configuration may be taken such that one type of data is inputted by the five multi-layer channels of the color and gloss signal. Also, the gloss data is not limited to GlSp, and it is possible to only have Gl or Sp.

Furthermore, a gloss color may be used as gloss data indicating another feature of GlSp. For example, Gl corresponds to a colorless specular gloss, but may be data indicating a color such as a specular gloss red Glr, a specular gloss green Glg, or a specular gloss blue Glb. Also, Sp corresponds to a colorless gloss clarity, but may be data indicating a color, such as a gloss clarity red Spr, a gloss clarity green Spg, or a gloss clarity blue Spb. Each of the above described colors is gloss colors based on RGB, but representation may be in a luminance and chromaticity type color system such as YUV or Lab.

A color and gloss signal acquisition unit 1102 transforms an inputted color and gloss signal to a color signal Lab corresponding to CIELAB, a gloss signal g corresponding to specular gloss, and a gloss signal s corresponding to gloss clarity. The signal Labgs that the color and gloss signal acquisition unit 1102 outputs is ideally a signal corresponding to the measurement value and independent from the device.

A transformation method defined for a standard color space such as sRGB or AdobeRGB may be used for the transformation from a color signal RGB to a color signal Lab. Alternatively, the color signal Lab corresponding to the color signal RGB may be computed using a publicly known interpolation calculation referencing a color table (a three dimensional look up table) stored in the storage unit 203 or the like in which a correspondence relationship between the color signal RGB and the color signal Lab is described.

A defined standard transformation method may also be used for a transformation from the gloss signal Gl to the gloss signal g and for a transformation from the gloss signal Sp to the gloss signal s. Alternatively, a transformation may be performed using an interpolation calculation referencing a gloss table describing a correspondence relationship between the gloss signal s and the gloss signal Sp, and a correspondence relationship between the gloss signal g and the gloss signal Gl which is stored in the storage unit 203.

In a case where a color table or a gloss table are used, ideally color tables and gloss tables are prepared for every type of color and gloss data, for every device which generates the color and gloss data, or the like, and the table to use for transformation is selected based on identification information described on a header of the color and gloss data. Of course the table used for a transformation may be selected based on a user instruction.

Note, the transformation may be other than one that transforms from RGBGlSp to Labgs. For example, in a case where only RGBGl is given, a transformation which increases gloss data for data of gloss clarity, specular gloss and Labgs is possible. In this case, the specular gloss g and the gloss clarity s which are linearly proportional to the value Gl may be set. Note, a non-linear relation, or an inversely-proportional relation with respect to the value Gl may be taken. On the other hand, a transformation that reduces the gloss data such as from RGBGlSp to Labg is also possible. A transformation from data defining a color of the gloss such as RGBGlrGlgGlb to a monochrome signal of the gloss such as Labg may be performed, and the opposite is also possible.

A color and gloss mapping unit 1103 generates a signal L'a'b'g's' that maps a signal Labgs into a gloss representable range by the previously described color mapping and gloss mapping. Note that the color and gloss mapping unit 1103 references the representation range information of the gloss representation device 209 stored in the storage unit 203 or the like.

A signal transformation unit 1104 transforms the signal L'a'b'g's' into a printing material amount signal corresponding to an amount of printing material of the gloss representation device 209 (a color material amount signal CMYK and a gloss adjustment material amount signal AB), and a recording method signal (hereinafter referred to as a pass number signal P) that indicates the recording method of the gloss representation device 209. A transformation of the signal transformation unit 1104 is performed with reference to a device property table of the gloss representation device 209 stored in the storage unit 203 or the like.

FIG. 10 illustrates an example of a device property table of the gloss representation device 209. In the device property table, a signal Labgs corresponding to a pass number signal P and a discrete printing material amount signal CMYKAB are described. A color material amount signal CMYK is a signal related to an amount of color material, and is a digital signal with eight bits for each color, for example. The gloss adjustment material amount signal AB is a signal related to the respective amounts of the gloss adjustment materials A and B, and is a digital signal having eight bits for each, for example. The pass number signal P is a signal related to the number of recording passes n. The pass number signal P takes a value between one and sixteen, for example, and the pass number signal P=one, the pass number signal P=two, . . . , and the pass number signal P=sixteen respectively indicate one-pass recording, two-pass recording, . . . , and sixteen-pass recording.

A halftone processing unit 1105 applies halftoning processing to the printing material amount signal CMYKAB that the signal transformation unit 1104 outputs by an error diffusion method or an ordered dither method or the like, and outputs a binary signal C'M'Y'K'A'B' corresponding to the resolution of the gloss representation device 209. The binary signal C'M'Y'K'A'B' indicates whether a color material and a gloss adjustment material dot is recorded or not recorded, that is it indicates recording positions of the dots of the color material and the gloss adjustment material. A dot is recorded for a position where the signal value is "1", for example, and not recorded for a position where the signal value is "0".

An output signal generation unit 1106, based on the pass number signal P, as well as a binary signal C'M'Y'K'A'B' after halftoning processing indicating a color material and gloss adjustment material dot arrangement, generates an output signal that is output to the gloss representation device 209 by performing pass breakdown processing. By the pass breakdown processing, a logical product of a pass mask and the binary signal C'M'Y'K'A'B' is calculated, and a dot arrangement signal C"M"Y"K"A"B" indicating a dot arrangement of printing material recorded in each pass is generated as an output signal.

The pass mask is configured by, for example, sixteen sets from one for one-pass recording to one for sixteen-pass recording, and the output signal generation unit 1106 selectively uses the pass mask set corresponding to the pass number signal P. For example, if the pass number signal P=two, the dot arrangement of the cyan color material of the first pass is generated by a logical product of the pass mask for the first pass of the pass mask set for two-pass recording, and a binary signal C' indicating dot recording positions for the cyan color material.

FIGS. 11A-11G are views illustrating examples of pass masks. Note that in FIGS. 11A-11G, examples in which the pass masks are 4×4 (examples in which the number of nozzles for each printing material of the printhead is four, and recording is of a maximum of four passes) are illustrated for simplicity. If from one-pass recording to sixteen-pass recording is performed, at least the number of nozzles for a printing material will be sixteen, and the pass masks will be 16×16.

Figures 11A, 11B, 11C, 11D, 11E, 11F, 11G:
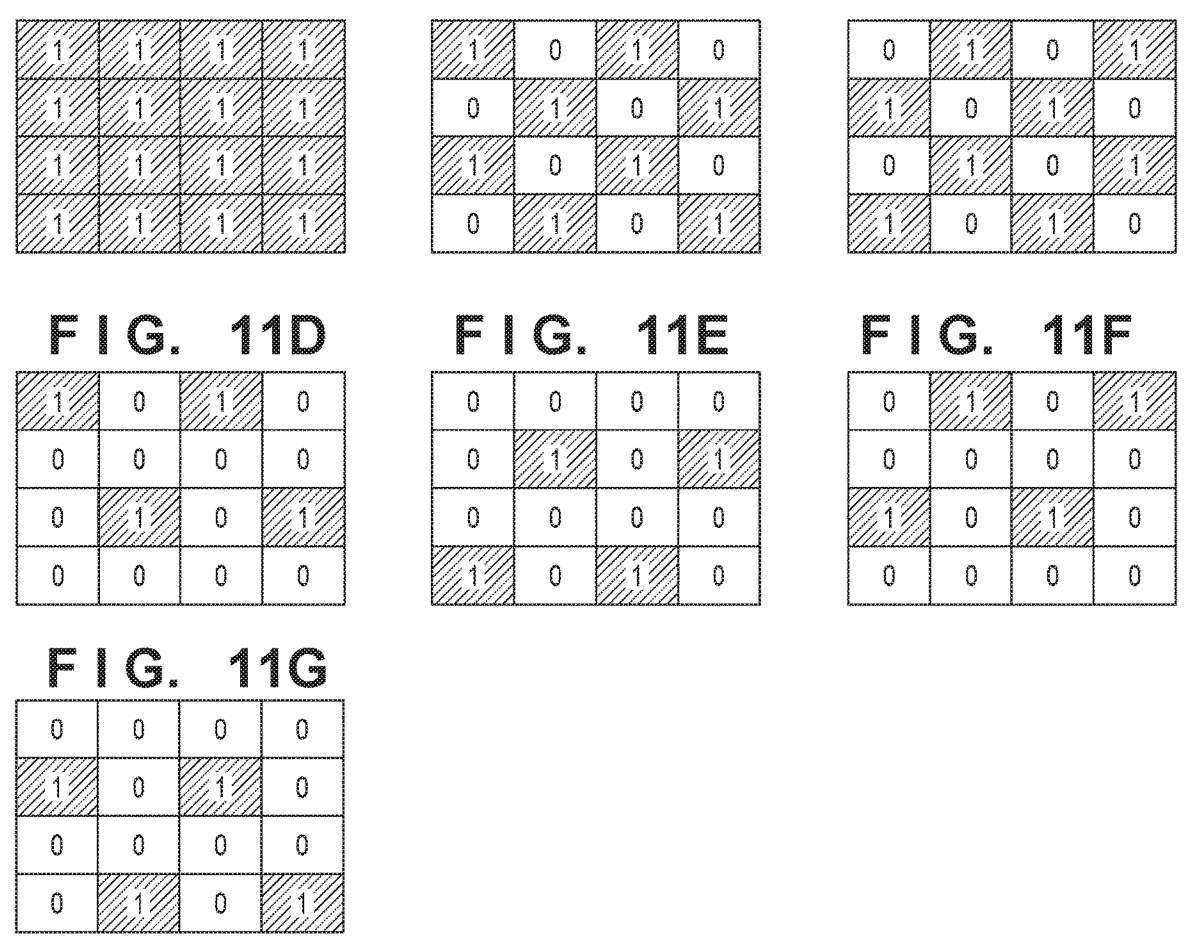

FIG. 11A illustrates a pass mask for a first pass for one-pass recording. Because all dots are recorded in the first pass in one-pass recording, all cells in that pass mask are set to "1".

FIGS. 11B and 11C illustrate a pass mask set for two-pass recording, and FIG. 11B is a pass mask for the first pass, and FIG. 11C is a pass mask for the second pass. In two-pass recording, because recording is performed dividing the dots between the first pass and the second pass, values that invert the values of each cell of the pass mask for the first pass are set in respective cells of the pass mask for the second pass.

FIG. 11D through FIG. 11G illustrate a pass mask set for four-pass recording, and FIG. 11D is the pass mask for the first pass, FIG. 11E is the pass mask for the second pass, FIG. 11F is the pass mask for the third pass, and FIG. 11G is the pass mask for the fourth pass. In four-pass recording, because recording is performed dividing the dots between the first through fourth passes (four passes), cells having the value "1" do not overlap between pass masks, and the values of the cells are set so there is an equal arrangement in the respective pass masks.

In this way, in n-pass recording, because recording is performed dividing the dots between the first pass through n-th passes (n passes), cells having the value "1" do not overlap between pass masks, and the values of the cells are set so there is an equal arrangement in the respective pass masks. Note that different pass masks may be prepared for each type of printing material.

The processing of the color and gloss signal acquisition unit 1102, the color and gloss mapping unit 1103, the signal transformation unit 1104, the halftone processing unit 1105 and the output signal generation unit 1106 is performed in units of pixels. Accordingly, by the output signal generation unit 1106 switching the pass mask set applied to the pass breakdown in accordance with the pass number signal P for each pixel, a dot arrangement signal C"M"Y"K"A"B" for which the number of recording passes is controlled is generated for each pixel.

The output signal generation unit 1106 stores a dot arrangement signal C"M"Y"K"A"B" for each record pass in a pass buffer 1107 allocated in the main memory 202 or the storage unit 203. The pass buffer 1107 is similar to a line buffer that can store data of a plurality of lines, and can store the dot arrangement signals C"M"Y"K"A"B" for a plurality of record passes.

In the case where one-pass recording through sixteen-pass recording is performed, for example, data of the storage area corresponding to the first pass of the pass buffer 1107 indicates the positions at which to discharge each printing material in the first pass. Similarly, data of the storage area corresponding to the second pass indicates positions at which to discharge each printing material in the second pass, . . . , and data of the storage area corresponding to the sixteenth pass indicates positions at which to discharge each printing material in the sixteenth pass. In other words, a logical OR of data stored in the storage areas corresponding to each recording pass of the pass buffer 1107 indicates positions at which to discharge each printing material in a unit recording area corresponding to the recording width L of the printhead.

A recording unit 1108 of the gloss representation device 209 performs sixteen main-scans, for example, of a unit recording area. Here, the dot arrangement signals C"M"Y"K"A"B" from the storage areas of the pass buffer 1107 are outputted sequentially corresponding to the main-scanning as the output signal of the image processing apparatus 1100. The recording unit 1108 drives the printhead to discharge the printing material of each nozzle based on the dot arrangement signals C"M"Y"K"A"B". When the recording of a unit recording area completes, the recording unit 1108 conveys the recording paper 3208 by the recording width L, and performs recording of the next unit recording area. A reproduction 1109 is generated by such unit recording area recording operations being repeated.

Note that if the logical OR of the data stored in each storage area of the pass buffer 1107 is "0", it is not necessary to discharge printing material in the recording pass corresponding to that storage area. In such a case, the recording unit 1108 can proceed to processing of the next recording pass omitting the main-scan of that recording pass. That is, even if setting is performed so that the pass number signal P takes a value from one to sixteen, for example, it does not mean that it is always necessary to perform main-scanning sixteen times for a unit recording area. That is, unit recording area main-scanning is repeated in a range from one time to a predetermined number of times corresponding to the maximum value of the pass number signal P.

Also, the order in which the dot arrangement signals are outputted may be in ascending order from the first pass to the n-th pass, or may be in descending order. Alternatively, a random output order is also possible. Also, each storage area of the pass buffer 1107 is cleared after the processing of the recording unit 1108 related to the main-scan of an n-pass recording (n-pass printhead movement is not necessarily required) is completed. Alternatively, at a point in time at which the processing of the recording unit 1108 related to the main-scanning of the recording pass corresponding to the storage area (movement of the printhead in that recording pass is not necessarily required) completes, that storage area is cleared.

In this way, color and gloss mapping is performed in a case where the color and gloss signal are outside of the gloss representable range of the gloss representation device 209. Also, a gloss clarity is controlled for each pixel by control of the number of recording passes n for each pixel. Accordingly, it is possible to generate the reproduction 1109 which advantageously represents color and gloss of the target that the color and gloss data indicate.

In the foregoing example, an example in which a transformation is performed from Labgs to a CMYKABP signal is illustrated, but the transformation is not limited to this. For example, control may be performed for only the gloss adjustment material amount of CMYKAB from Labg (specular gloss), and control may be performed for one gloss adjustment material amount such as CMYKA or CMYKB. Also, control may be performed for only the number of passes from Labs (gloss clarity) to CMYKP, and control may be performed for both the gloss adjustment material amount and the number of passes of the signal for only gloss clarity and from Labs (gloss clarity) to CMYKABP.

Also, step S101 of the gloss representation processing illustrated in FIG. 2; step S102; and step S103 and step S104 are processes performed by the data input unit 1101; the color and gloss signal acquisition unit 1102; and the color and gloss mapping unit 1103 respectively. Similarly, step S105 is a process that the signal transformation unit 1104, the halftone processing unit 1105 and the output signal generation unit 1106 which constitute a signal generation unit 1110 perform, and step S106 is a process that the recording unit 1108 performs.

Also, in FIG. 9, an example in which the data input unit 1101 through to the output signal generation unit 1106 of the image processing apparatus 1100 are realized by an information processing apparatus illustrated in FIG. 5 executing the image processing illustrated in FIG. 2 is illustrated. However, it is possible to embed some or all of these processing units into the gloss representation device 209.

Gloss Mapping Unit

Figure 12:
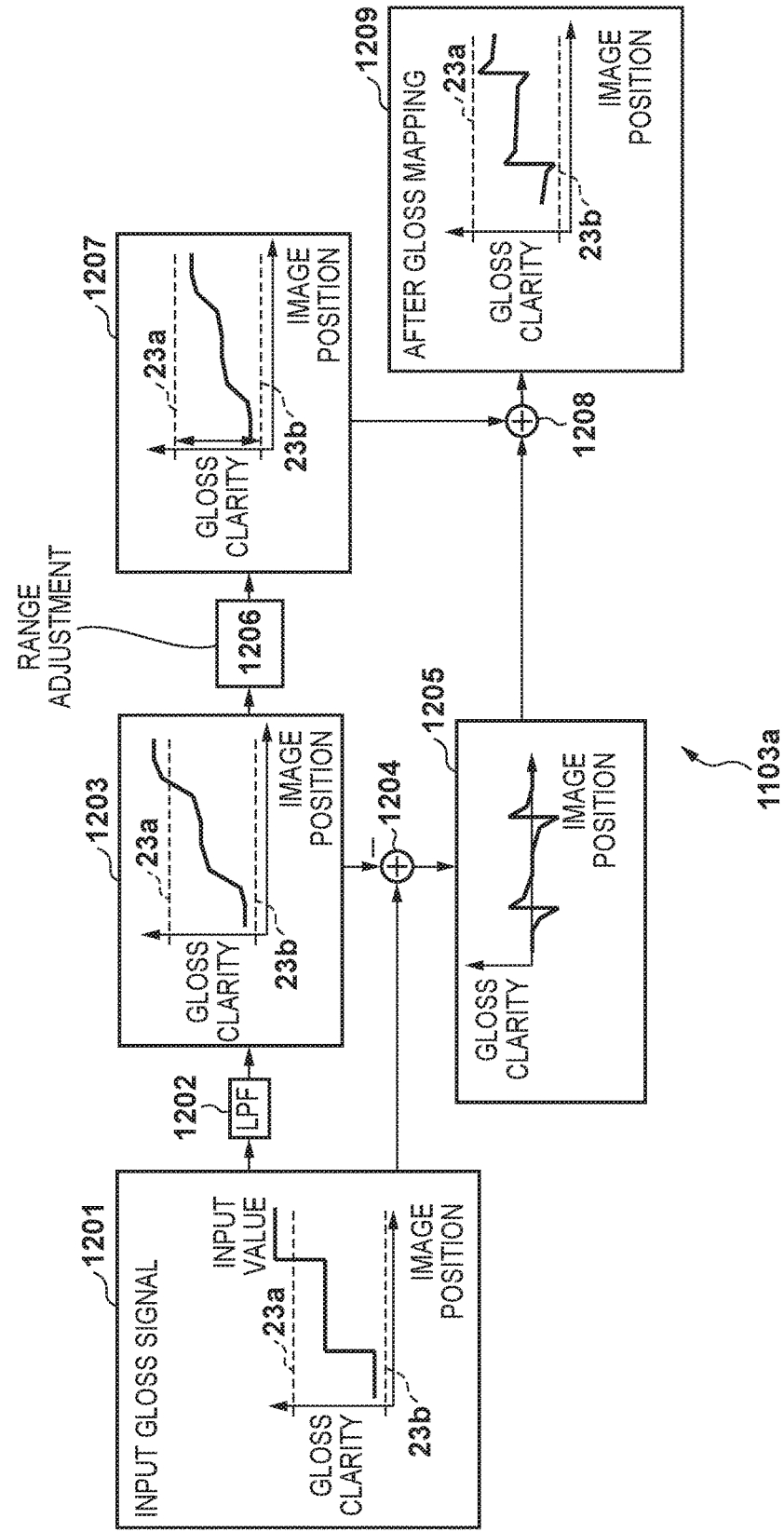
FIG. 12 is a block diagram illustrating an example of a processing configuration of a gloss mapping unit.

By the block diagram of FIG. 12, a processing configuration example of the gloss mapping unit 1103a of the color and gloss mapping unit 1103 is illustrated. When a gloss signal 1201 is input, a gloss mapping unit 1103a applies low-pass filter processing (LPF) 1202 to the input gloss signal 1201, and acquires a low-frequency component 1203 of the input gloss signal 1201. Then, by a differential calculation 1204 subtracting the low-frequency component 1203 from the input gloss signal 1201, a local change component 1205 is computed. The local change component 1205 corresponds to a change of gloss clarity in the local change area 403 illustrated in FIG. 4B.

Next, the gloss mapping unit 1103a performs a range adjustment 1206 on the low-frequency component 1203 to acquire a low-frequency component 1207 after adjustment. The range adjustment 1206 is a process for reducing and compressing a dynamic range of the signal by accumulating an input signal value and a predetermined value x (0<x<1), a gamma transformation or the like. Generally, the dynamic range of a signal depends on a low-frequency component of the signal, and by reducing and compressing the range of the low-frequency component of the signal, it is possible to cause the dynamic range of the signal to be reduced. That is, the range adjustment 1206 reduces and compresses the range of the input signal into a gloss representable range that the representation range information indicates.

Next, the gloss mapping unit 1103a generates a gloss signal 1209 after the gloss mapping by an addition operation 1208 that the local change component 1205 adds to the low-frequency component 1207 after the adjustment. In other words, the local change component 1205 which corresponds to the change of the gloss clarity in the local change area 403 is added to the low-frequency component 1207 after the adjustment which is the gloss signal in which the dynamic range is compressed. The result of that is that it is possible to achieve the gloss signal 1209 (the gloss signal 25 illustrated in FIG. 3) after the gloss mapping saves information indicating the local gloss differences while causing the dynamic range of the gloss signal to be reduced.

Also, the gloss mapping unit 1103 performs gloss mapping independently maintaining the color signal after color mapping. The result of this is that a reproduction in which a good reproduction of a particularly important color is generated. Also, the gloss mapping unit 1103 transforms (mapping) the gloss signal so to save information indicating a local gloss difference in accordance with a spatial distribution of the gloss signal. For example, for gloss clarity, a difference in values of the size of the spatial distribution of the local gloss clarities is saved.

The gloss mapping related to gloss clarities is described above, but it is possible to apply similar gloss mapping to specular gloss as well. Also, it is possible to apply similar gloss mapping to gloss color components. In this way, even if the gloss of the target is a gloss that the gloss representation device 209 cannot represent, a satisfactory reproduction can be achieved by an advantageous gloss representation, and it is possible to maximize the effect in relation to gloss which is observed or seen.

Second Embodiment

An image processing apparatus and an image processing method according to a second embodiment of the present invention will be described hereinafter. Note that in the second embodiment, for configurations that are substantially similar to the first embodiment, the same reference numerals are given, and there are cases where detailed description thereof is omitted.

In the first embodiment, an example in which a gloss signal range adjustment is performed from only the input gloss signal is described. In the second embodiment, an example in which a gloss signal range adjustment is performed considering the input color and gloss signal is described.

Figure 13:
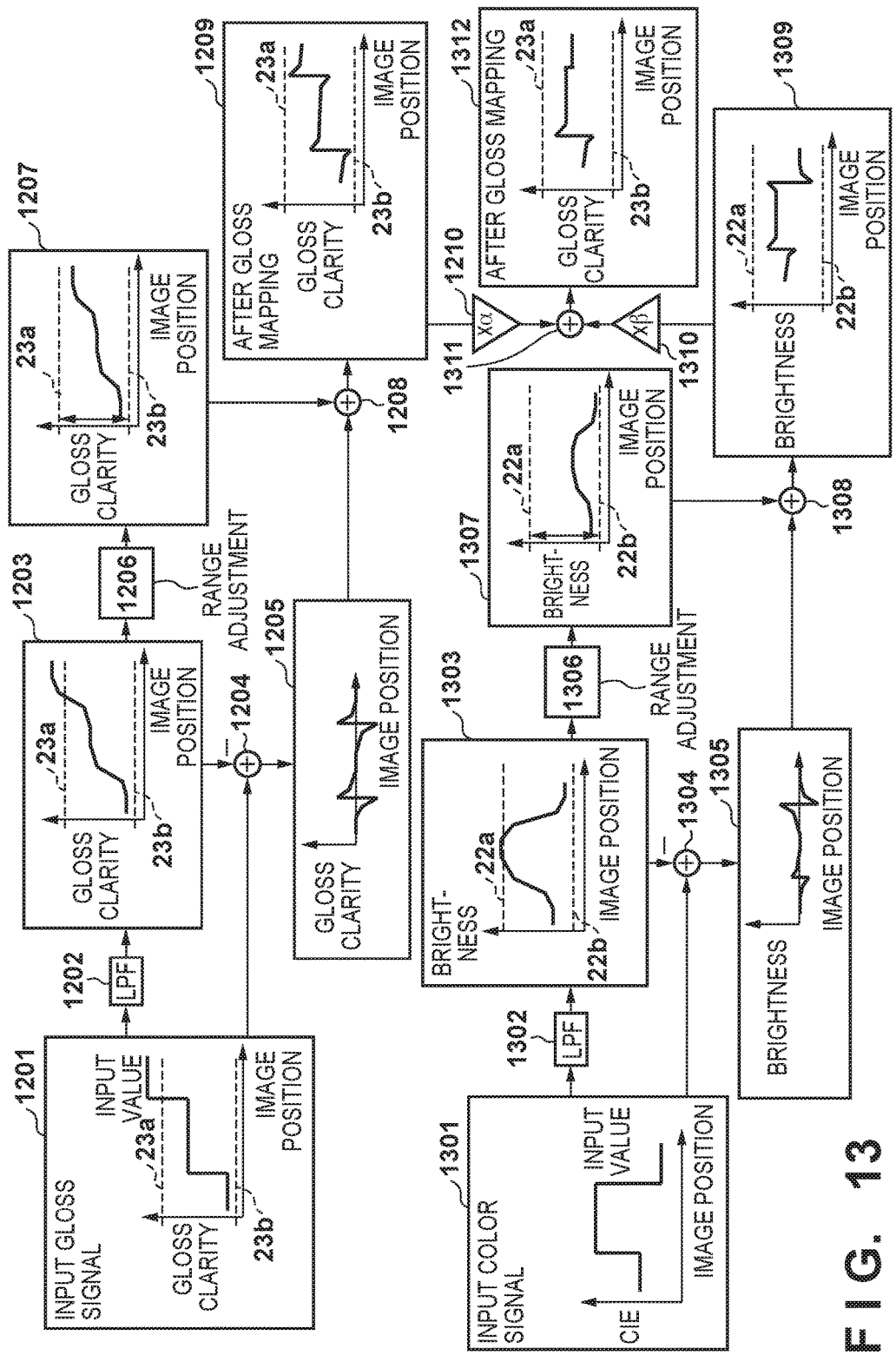
FIG. 13 is a block diagram illustrating an example of a processing configuration of a gloss mapping unit of a second embodiment.

By the block diagram of FIG. 13, a processing configuration example of the gloss mapping unit 1103a of the second embodiment is illustrated. Note that the configurations indicated by reference numerals 1201-1209 are the same as the configurations indicated in FIG. 12, and detailed description thereof is omitted. Note that in FIG. 13, reference numerals 22a and 22b illustrate representation ranges of brightness in the gloss representable range of the gloss representation device.

When a color signal is input, a gloss mapping unit 1103a applies an LPF process 1302 to the input luminance signal (L*) 1301, and acquires a low-frequency component 1303 of an input luminance signal 1301. Then, by a differential calculation 1304 subtracting the low-frequency component 1303 from the input luminance signal 1301, a local change component 1305 is computed. The local change component 1305 corresponds to a change of brightness (contrast) in the local change area 403 illustrated in FIG. 4B.

Next, the gloss mapping unit 1103a performs a range adjustment 1306 similar to the range adjustment 1206 on the low-frequency component 1303 to acquire a low-frequency component 1307 after adjustment. The range adjustment 1306 reduces and compresses the range of the input signal into a brightness representation range that the representation range information indicates.

Next, the gloss mapping unit 1103a generates a luminance signal 1309 after the mapping an addition operation 1308 that the local change component 1305 adds to the low-frequency component 1307 after the adjustment. In other words, the local change component 1305 which corresponds to a change in brightness (contrast) in the local change area 403 is added to a luminance signal 1307 in which the dynamic range is compressed. The result of this is that it is possible to achieve the luminance signal 1309 which saves information indicating a local contrast while causing the dynamic range of the luminance signal to be reduced. In other words, the gloss mapping unit 1103a maps the luminance signal so as to save information indicating a local brightness difference (contrast) in accordance with a spatial distribution of the luminance signal.

Next, the gloss mapping unit 1103a generates a gloss signal 1312 after the gloss mapping by linearly calculating the luminance signal 1309 generated from the input luminance signal 1301 and the gloss signal 1209 generated from the input gloss signal 1201. The linear calculation is a calculation in which a gain α is multiplied with the gloss signal 1209 by a multiplier 1210, and a gain β is multiplied with the luminance signal 1309 by a multiplier 1310, and a summation (a linear sum) of the results of these multiplications by an adder 1311 is made to be the gloss signal 1312 after the gloss mapping. In other words, the linear calculation is expressed by the following equation.

$$s'=\alpha \times s + \beta \times L \quad (1)$$

Here, s' is the value of the gloss signal 1312 after the gloss mapping;

s is the value of the gloss signal 1209;

L is the value of the luminance signal 1309; and $0<\alpha \leq 1$, $\beta=1-\alpha$ ($\alpha=1$ is the configuration of the first embodiment).

By adjusting the gains α and β, it is possible to adjust to values in which an advantageous gloss representation is possible even in a case where the input gloss signal and/or the input luminance signal are not included in the gloss representable range of the gloss representation device 209. Above, an example in which the gains α and β are made to be fixed values is described, but the gains α and β may be caused to change in accordance with the input gloss signal, the input luminance signal or the like. For example, the gains α and β may be caused to change so that in a case in which the input gloss signal s is greater than or equal to a predetermined threshold (s≥th) α=0.5 and β=0.3, and in the case of less than the predetermined threshold (s<th) α=0.8 and β=0.5 or the like. Also, in accordance with the input gloss signal, the gains α and β may be caused to change consecutively.

In the foregoing example, gloss is represented in a linear sum from information of gloss and brightness, but configuration may be taken to use a non-linear weighted sum. Also, color information other than brightness may be used as color (for example, a or b of Lab, or U or V of YUV).

In this way, if a gloss mapping is performed by using information other than a gloss signal, a more flexible gloss mapping becomes possible. For example, it becomes possible to adjust the gloss clarity and the specular gloss in accordance with the brightness of the target, and it is possible to broaden the degree of freedom of the advantageous gloss representation.

Note that in the second embodiment an example in which gloss mapping is performed based on an input gloss signal and an input luminance signal was described, but it is possible to perform gloss mapping using only the input luminance signal without referencing the input gloss signal. In such a case, a gain coefficient α=0 can be set in the equation (1). In other words, it is possible to switch a gloss mapping that uses only an input gloss signal (the first embodiment), a gloss mapping that is based on the input gloss signal and the input luminance signal (the second embodiment), and a gloss mapping that uses only the input luminance signal by controlling the gain coefficients α and β. Then, the user can determine which gloss mapping to use, or which reproduction 1109 to employ.

[Variation]

Above, an ink-jet printer of a serial type was exemplified as a texture reproduction device, but it is possible to use a full-line type ink-jet printer, an electrographic printer, a dye sublimation printer, a serigraph or the like as the texture reproduction device. Alternatively, the UV printer that forms a surface shape, or a 3D printer that forms a three-dimensional shape may be used, and the present invention can be applied to an image display device such as a display, a projector, or the like and is not limited to printers.

Also, above an example in which six types of CMYKAB are made to be the printing materials of the gloss representation device is described, but printing materials of red, white, and gold, for example, may be used, and gloss adjustment materials of three or more types may be used. Also, in a gloss representation device other than an ink-jet printer, a toner, film or the like may be used as a printing material. Also, a head cartridge that discharges ink may be configured to provide droplets of a plurality of sizes dividedly.

Media other than paper such as a glossy paper or a normal paper may be used for the recording medium. For example, a material such as a cloth or a film may be used, and the surface thereof may be uneven. Also, in a case where the reproduction is not a sheet form as with a three-dimensional object, a mechanism corresponding to the conveyance of the recording medium may be provided in the texture reproduction device.

Also, it is not necessary to perform the gloss representation processing on the entire area of an image that the color and gloss data expresses. Cases in which the gloss representation processing is not applied to a portion of the area, and cases in which the gloss representation processing is only applied to a portion of the area are encompassed in the present invention. For example, processing may perform reproduction using a specific printing material rather than performing gloss mapping of a portion of the area of the image that the color and gloss data expresses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-133918, filed Jul. 2, 2015, which is hereby incorporated by reference herein in its entirety.

What is claimed is:

1. An image processing apparatus that performs gloss representation processing for representing a gloss of a target, the apparatus comprising:
   a processor; and
   a memory storing a program that, when executed by the processor, causes the processor to function as:
      an input unit configured to input image data including at least one of a color signal and a gloss signal that expresses a target that is reproduced;
      a mapping unit configured to map, based on information indicating a gloss representable range of a gloss representation device, the image data to the gloss representable range; and
      a generation unit configured to generate, based on image data after the mapping, an output signal outputted to the gloss representation device,
   wherein the mapping unit:
      performs a mapping that saves information indicating a local gloss difference in accordance with a spatial distribution of the image data as the mapping of the image data,
      performs, in accordance with a spatial distribution of at least one color signal included in the color signal, mapping of a color signal that saves information indicating a local brightness difference, and outputs, as a gloss signal mapping result, a weighted sum of a gloss signal after the mapping and a color signal after the mapping.

2. The apparatus according to claim 1, wherein the mapping unit is further configured to:

acquire a first low-frequency component of the gloss signal by low-pass filter processing;

compute a first difference that subtracts the first low-frequency component from the gloss signal;

adjust a range of the first low-frequency component; and add the first difference and the first low-frequency component after the adjustment.

3. The apparatus according to claim 2, wherein the first adjustment unit reduces a dynamic range of the first low-frequency component to the gloss representable range.

4. The apparatus according to claim 2, wherein the mapping unit is further configured to:

acquire a second low-frequency component of the at least one color signal by low-pass filter processing;

compute a second difference that subtracts the second low-frequency component from the at least one color signal;

adjust a range of the second low-frequency component; and add the second difference and the second low-frequency component after the adjustment.

5. The apparatus according to claim 4, wherein the second adjustment unit reduces a dynamic range of the second low-frequency component to the gloss representable range.

6. The apparatus according to claim 4, wherein the mapping unit comprises a unit configured to the compute the weighted sum of a gloss signal that the first addition unit outputs and a signal that the second addition unit outputs.

7. The apparatus according to claim 1, wherein the generation unit comprises:

a transformation unit configured to reference a device property table of the gloss representation device to transform color and gloss data after the mapping into recording material amount signals corresponding to amounts of each of a plurality of recording materials of the gloss representation device, and a recording method signal indicating a recording method in the gloss representation device;

a halftone processing unit configured to perform halftoning processing on the recording material amount signal; and an output signal generation unit configured to, based on the recording method signal, generate, as the output signal, a dot arrangement signal indicating a dot arrangement of each of the plurality of recording materials from a recording material amount signal after the halftoning processing.

8. The apparatus according to claim 7, wherein the output signal generation unit, based on a number of recording passes that the recording method signal indicates, breaks the recording material amount signal after the halftoning processing into passes, and generates the dot arrangement signal for each recording pass.

9. The apparatus according to claim 8, further comprising a buffer unit having a plurality of storage areas and configured to store, in a storage area corresponding to a respective recording pass, the dot arrangement signal of that recording pass.

10. The apparatus according to claim 9, wherein the dot arrangement signals stored in the respective storage areas of the buffer unit are output to the gloss representation device sequentially.

11. The apparatus according to claim 9, wherein the gloss representation device repeats main-scanning that records, in a unit recording area, a plurality of recording material dots based on the dot arrangement signal corresponding to the respective recording pass in a range from one time to a predetermined number of times.

12. The apparatus according to claim 11, wherein the unit recording area corresponds to an area that the gloss representation device can record in one main-scan.

13. The apparatus according to claim 7, wherein the gloss representation device has color material and gloss adjustment material as the plurality of recording materials.

14. A method of image processing that performs gloss representation processing for representing a gloss of a target, the method comprising:

inputting image data including at least one of a color signal and a gloss signal that expresses a target that is reproduced;

mapping, based on information indicating a gloss representable range of a gloss representation device, the image data to the gloss representable range; and generating, based on image data after the mapping, an output signal outputted to the gloss representation device, wherein the mapping includes:

performing a mapping that saves information indicating a local gloss difference in accordance with a spatial distribution of the image data as the mapping of the image data is performed, performing, in accordance with a spatial distribution of at least one color signal included in the color signal, mapping of a color signal that saves information indicating a local brightness difference, and outputting, as a gloss signal mapping result, a weighted sum of a gloss signal after the mapping and a color signal after the mapping.

15. A non-transitory computer-readable storage medium storing a program which, when read and executed by a computer, causes the computer to execute a method of image processing that performs gloss representation processing for representing a gloss of a target, the method comprising:

inputting image data including at least one of a color signal and a gloss signal that expresses a target that is reproduced;

mapping, based on information indicating a gloss representable range of a gloss representation device, the image data to the gloss representable range; and generating, based on image data after the mapping, an output signal outputted to the gloss representation device, wherein the mapping includes:

performing a mapping that saves information indicating a local gloss difference in accordance with a spatial distribution of the image data as the mapping of the gloss signal is performed, performing, in accordance with a spatial distribution of at least one color signal included in the color signal, mapping of a color signal that saves information indicating a local brightness difference, and outputting, as a gloss signal mapping result, a weighted sum of a gloss signal after the mapping and a color signal after the mapping.

* * * * *